United States Patent [19]
Koden et al.

[11] Patent Number: 5,271,867
[45] Date of Patent: Dec. 21, 1993

[54] LIQUID CRYSTAL COMPOSITION AND LIQUID CRYSTAL DEVICE CONTAINING THE SAME

[75] Inventors: Mitsuhiro Koden; Tomoaki Kuratate, both of Nara; Makoto Shiomi, Tenri; Fumiaki Funada, Yamatokoriyama; Hiromi Inoue, Soka; Kazuhiko Tsuchiya, Edogawa; Atsushi Sugiura, Shinokoiwa; Tsunenori Fujii, Soka, all of Japan

[73] Assignees: Sharp Kabushiki Kaisha; Kanto Kagaku Kabushiki Kaisha Corporation, both of Japan

[21] Appl. No.: 827,581

[22] Filed: Jan. 27, 1992

Related U.S. Application Data

[63] Continuation of Ser. No. 570,038, Aug. 20, 1990, abandoned.

[30] Foreign Application Priority Data

Aug. 23, 1989 [JP] Japan .................................. 1-218112

[51] Int. Cl.⁵ ...................... C09K 19/34; C09K 19/12; C09K 19/52; G02F 1/13
[52] U.S. Cl. ........................... 252/299.61; 252/299.63; 252/299.64; 252/299.65; 252/299.66; 252/299.67; 252/299.01; 359/104
[58] Field of Search ...................... 252/299.01, 299.61, 252/299.62, 299.63, 299.64, 299.65, 299.66, 299.67; 359/104

[56] References Cited

U.S. PATENT DOCUMENTS

| | | | |
|---|---|---|---|
| 4,753,752 | 6/1988 | Raynes et al. .................. | 252/299.65 |
| 4,808,333 | 2/1989 | Huynh-ba et al. ............. | 252/299.66 |
| 4,882,086 | 11/1989 | Terashima et al. ............ | 252/299.61 |
| 4,911,863 | 3/1990 | Sages et al. ..................... | 252/299.65 |
| 5,053,163 | 10/1991 | Takeshita et al. .............. | 252/299.61 |

FOREIGN PATENT DOCUMENTS

| | | |
|---|---|---|
| 0272115 | 6/1988 | European Pat. Off. . |
| 0298702 | 1/1989 | European Pat. Off. . |
| 0360043 | 3/1990 | European Pat. Off. . |
| 2198743A | 6/1988 | United Kingdom . |

OTHER PUBLICATIONS

Japan Display '89, pp. 176-178.

*Primary Examiner*—Robert L. Stoll
*Assistant Examiner*—Shean C. Wu
*Attorney, Agent, or Firm*—David G. Conlin; Peter F. Corless

[57] ABSTRACT

A ferroelectric liquid crystal composition comprising a specific fluorophenyl compound (I) and a specific pyrimidine compound (II) and optionally a specific benzoate compound (III), which exhibits a high-speed response in room temperature and is useful for liquid crystal display devices of large capacity.

6 Claims, 1 Drawing Sheet

LIQUID CRYSTAL COMPOSITION AND LIQUID CRYSTAL DEVICE CONTAINING THE SAME

This is a continuation of copending application Ser. No. 07/570,038 filed on Aug. 20, 1990, now abandoned.

BACKGROUND OF THE INVENTION

1. Field of the Invention

The present invention relates to a ferroelectric liquid crystal composition and a ferroelectric liquid crystal device containing the same.

2. Description of the Related Art

Liquid crystal display devices most widely used at present are those utilizing nematic phase, but they have a drawback such that a display of large capacity such as of 1,000×1,000 lines is hard to realize. For example, in ordinary twisted nematic (TN) type liquid crystal display devices, contrast decreases as the number of lines increases, so that it is nearly impossible in practice to produce a display device of large capacity such as of 1,000×1,000 lines, with a good appearance.

In order to modify the drawback of the TN type liquid crystal display device, liquid crystal display devices of super twisted nematic (STN) type and double super twisted nematic (DSTN) type have been developed. However, they also have a drawback such that contrast and response speed decrease as the number of lines increases. Therefore, it is presently the utmost level that such display devices be provided with a display capacity of approximately 1,000×800 lines, by utilizing the upper-lower division driving method on a duty of 1/400.

On the other hand, there has been also developed a liquid crystal display device of active matrix type where thin film transistors (TFT) are arranged on a substrate, whereby a large capacity display of 1,000×1,000 lines and the like can be realized technically. However, the device has a drawback such that its production process takes a longer time with poor yield, leading to a very high production cost.

As a means to solve the problems described above, a ferroelectric liquid crystal display device, which is proposed as a liquid crystal display based on a principle different from the principle for the TN type display device, has been expected to be promising (see N. A. Clark, et al, Appl. Phys. Lett., 36, 899(1980)). In a such display device, a ferroelectric liquid crystal capable of exhibition chiral smectic C phase, chiral smectic I phase, etc. is utilized. Because the principle of the device is classified in a type utilizing memory characteristics, a larger display capacity may potentially be realized if response speed improves. Because the process does not require an active element such as thin film transistor, the cost for producing the liquid crystal device may not rise. Furthermore, the ferroelectric liquid crystal device has also a merit of a wide view angle, so that it is considered promising as an device for a display of a larger capacity of 1,000×1,000 lines or more.

The requirements for liquid crystal materials used in a ferroelectric liquid crystal device utilizing the smectic C phase aforementioned include the following items:
(1) exhibition of smectic C phase within a wide temperature range of which center is around room temperature;
(2) chemical stability;
(3) possessing large spontaneous polarization;
(4) lower viscosity;
(5) possessing phase sequences such as IAC (Isotropic-Smectic A-Smectic C) or INAC (Isotropic-Nematic-Smectic A-Smectic C);
(6) a long spiral pitch of nematic phase;
(7) a long pitch of smectic C phase;
(8) possessing a large tilt angle.

Items (3) and (4) are required in order to obtain high speed response necessary for realizing a large capacity display, while items (5), (6) and (7) are required in order to obtain good orientation and item (8) is needed in order to improve contrast and brightness in liquid crystal display.

However, it is impossible at present to satisfy all of such requirements with a single compound. Therefore, a plurality of compounds are mixed together and practically applied as a liquid crystal composition. For producing a ferroelectric liquid crystal composition, it is generally employed the process comprising adding an optically active compound capable of inducing a large degree of spontaneous polarization in a non-chiral liquid crystal compound or composition exhibiting smectic C phase. In the process there may be used sometimes an optically active compound with no characteristics as liquid crystal.

As the non-chiral compound or composition exhibiting smectic C phase, there may be used a liquid crystal composition comprising a mixture of several kinds of pyrimidine compounds [see Hiroyuki Onishi, Tsuyoshi Kamimura, Hisahide Wakita, Shuko Oniwa, Isao Ota, National Technical Report, 33(1), 35(1987)]. However, it is a disadvantage for such process that a sufficiently wide temperature range cannot be attained in smectic C phase if only pyrimidine compound is used.

Thus, there has been used a process comprising preparing a liquid crystal composition with a wide temperature range of smectic C phase by using pyrimidine compound and ester compound, and adding an optically active compounds to the composition [see H. Inoue, A. Mizutome, S. Yoshihara, J. Kanbe, S. Iijima, International Display Research Conference, Post. Deadline Paper, (1988)]. On the other hand, some reports suggest that ester compound is inferior to pyrimidine compound, regarding response characteristics [see for example, Hiroyuki Onishi, Tsuyoshi Kamimura, Hisahide Wakita, Shuko Oniwa, Isao Ota, National Technical Report, 33(1), 35(1987)].

SUMMARY OF THE INVENTION

The present invention has been accomplished under the foregoing situations. The present invention is to provide a novel optically active compound enabling to improve response characteristics of ferroelectric liquid crystal compositions, and to provide a ferroelectric liquid crystal composition and a ferroelectric liquid crystal device, which contain the novel optically active compound and are characterized by a wide operable temperature range, good orientation, and high-speed response at room temperature.

According to the present invention, there is provided a ferroelectric liquid crystal composition, comprising at least one compound represented by the following general formula (I):

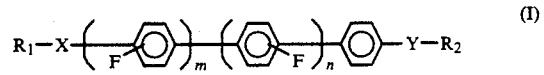

(I)

[wherein $R_1$ and $R_2$ independently represent an alkyl group or an alkoxyl group, having 1 to 15 carbon atoms; X and Y independently represent a single bond, or a group of —O—, —COO13 , or —OCO—; n and m independently represent 0 or 1] and at least one compound represented by the following general formula (II):

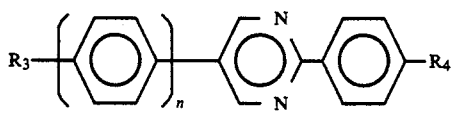

[wherein $R_3$ and $R_4$ independently represent an alkyl group or an alkoxyl group, having 1 to 15 carbon atoms; n represents 0 or 1]. Furthermore, the present invention provides a ferroelectric liquid crystal composition comprising the above ferroelectric liquid crystal composition and at least one compound represented by the following general formula (III):

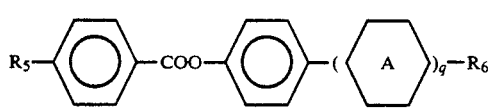

]wherein

$R_5$ and $R_6$ independently represent an alkyl group or an alkoxyl group, having 1 to 15 carbon atoms ; q represents 0,1 or 2 ].

The ferroelectric liquid crystal compositions of the present invention each stably exhibits a smectic C phase in a wider temperature range including room temperature, due to the compound represented by the general formula (I).

DETAILED DESCRIPTION OF THE PREFERRED EMBODIMENTS

Figure 1:
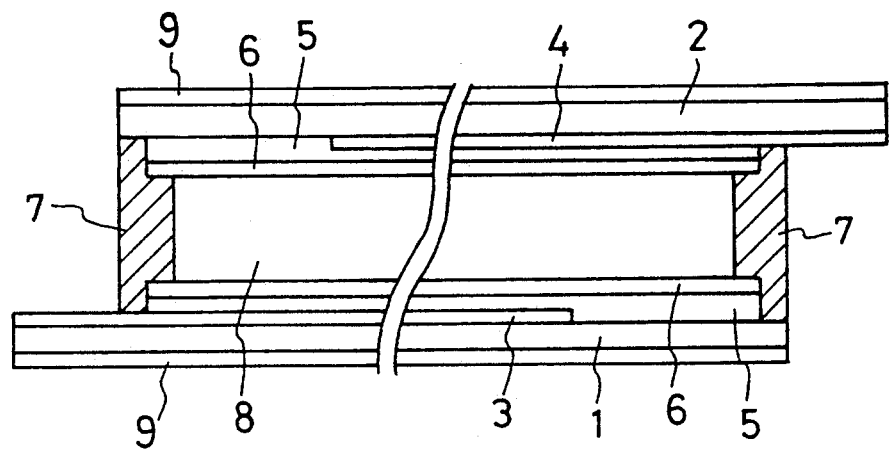
FIG. 1 is a sectional view illustrating a constitution of a ferroelectric liquid crystal device utilizing a ferroelectric liquid crystal composition of the present invention.

The compound represented by the general formula (I) described above (referred to as Compound I hereinafter), which is used in the ferroelectric liquid crystal composition of the present invention, has not been disclosed in any literature. The compound has been produced by the present inventors.

In Compound I aforementioned, $R_1$ and $R_2$ independently represent an alkyl group or an alkoxyl group, having 1 to 15 carbon atoms; such an alkyl group includes methyl, ethyl, propyl, i-propyl, butyl, 1- or 2-methylpropyl, t-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methylnonyl, undecyl, 1-methyldecyl, dodecyl, 1-methylundecyl, etc.. These alkyl groups may contain asymmetric carbons in the carbon chains thereof.

In the Compound I, X and Y each represents a single bond or a group of —O—, —COO— or —OCO—; that is, when each of X and Y is a single bond, RX and RY independently represent an alkyl group; when each of X and Y is —O—, RX and RY independently represent an alkoxyl group; when each of X and Y is —COO—, RX and RY independently represent an acyloxy group; when each of X and Y is —OCO—, RX and RY independently represent an alkoxylcarbonyl group.

Preferably, the Compound I itself is a liquid crystal compound exhibiting a liquid crystal phase, in particular smectic A phase and/or smectic C phase. Specific examples of such compound include the following but they are not intended to limit the invention.

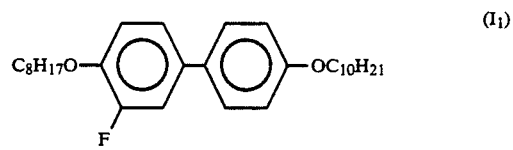

(I₁)

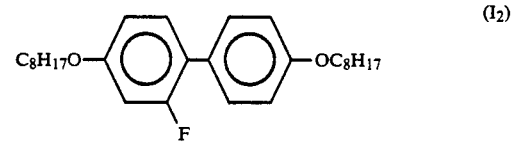

(I₂)

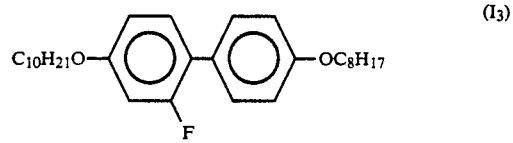

(I₃)

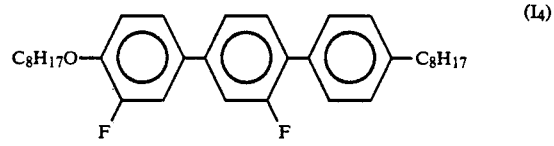

(I₄)

Compound illustrated above may be used singly or in combination with two or more thereof.

A typical example of the process for producing Compound I aforementioned is now explained, illustrating a biphenyl compound, an example of the Compound I.

(A) There will now be described a compound having an alkoxyl group at side chains:

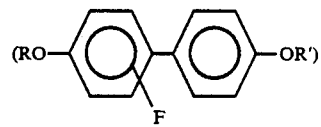

2-Fluorophenol as a starting material is treated with alkyl halide (RX) to obtain 2-fluoro-1-alkoxybenzene, which is then halogenated to produce 2-fluoro-4-halogeno-1-alkoxybenzene:

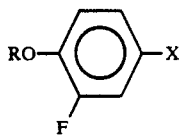

Grignard reaction of the 2-fluoro-4-halogeno-1-alkoxybenzene, thus produced, with a Grignard reagent

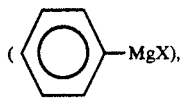

separately prepared, provides a biphenyl compound:

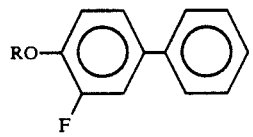

The biphenyl compound is subjected to Friedel-Craft reaction to be modified into an acylbiphenyl compound:

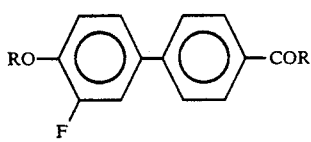

which is subsequently converted into a hydroxybiphenyl compound:

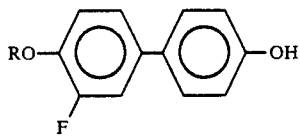

The hydroxybiphenyl converted is treated with alkyl halide (R'X) to obtain a dialkoxymonofluorobiphenyl compound:

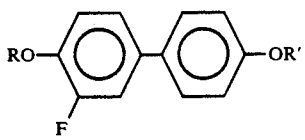

A desired product may be obtained, by selecting alkyl halide (RX, R'X), as R and R' at side chains.

(B) There will now be explained a compound having alkyl groups at side chains:

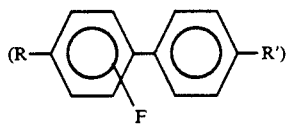

The compound may be synthesized as in the above synthetic process in association with those having alkoxyl groups at side chains, except that reduction is carried out following acylation by Friedel-Craft reaction and that alkylbenzene is used at preparation of a Grignard reagent.

(C) A compound having an alkoxyl group and an alkyl group at two side chains, separately, may be synthesized as in item (A) described above, except that selection is performed regarding whether reduction is carried out after acylation by Friedel-Craft reaction or alkylbenzene is used at preparation of Grignard reagent, to introduce an alkoxyl group or an alkyl group at an appropriate side chain thereof.

(D) An example of synthesizing triphenyl compounds belonging to Compound I is described below.

4-Bromo-2-fluorobiphenyl as a starting material is subjected to acylation by Friedel-Craft reaction to convert it into 4'-acyl-4-bromo-2-fluorobiphenyl, which is then converted into a 4'-hydroxybiphenyl compound. The 4'-hydroxybiphenyl compound is treated with alkyl halide (RX) to obtain a 4'-alkoxybiphenyl compound. On the other hand, a Grignard reagent having a benzene nucleus with a fluoro group and an alkoxyl group both being introduced thereinto:

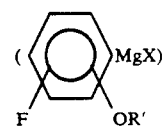

is prepared separately. The 4'-alkoxybiphenyl compound aforementioned along with the Grignard reagent thus obtained is subjected to Grignard reaction to obtain a triphenyl compound, dialkoxydifluorotriphenyl compound:

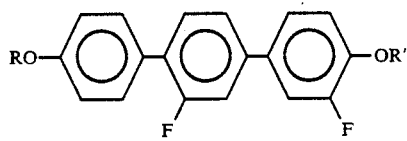

The alkyl group or alkoxyl group at the side chains may be selected in the same manner as described above. Furthermore, monofluorotriphenyl compound may be synthesized by using, as a starting material, either one of biphenyl compound and Grignard reagent, both without monofluoro group.

The principle of the process for producing Compound I is heretofore mentioned. The Examples described below may be referenced as specific examples of such production.

As the compound represented by the general formula (II) (referred to as Compound II ) and the compound III represented by the general formula (III) (referred to as Compound III), the corresponding liquid crystals known in the art may be used.

The alkyl group or an alkoxyl group of Compounds II and III, having 1 to 15 carbon atoms, includes the same as in Compound I.

Specific examples of Compound II include the following, but they are not limited to the following.

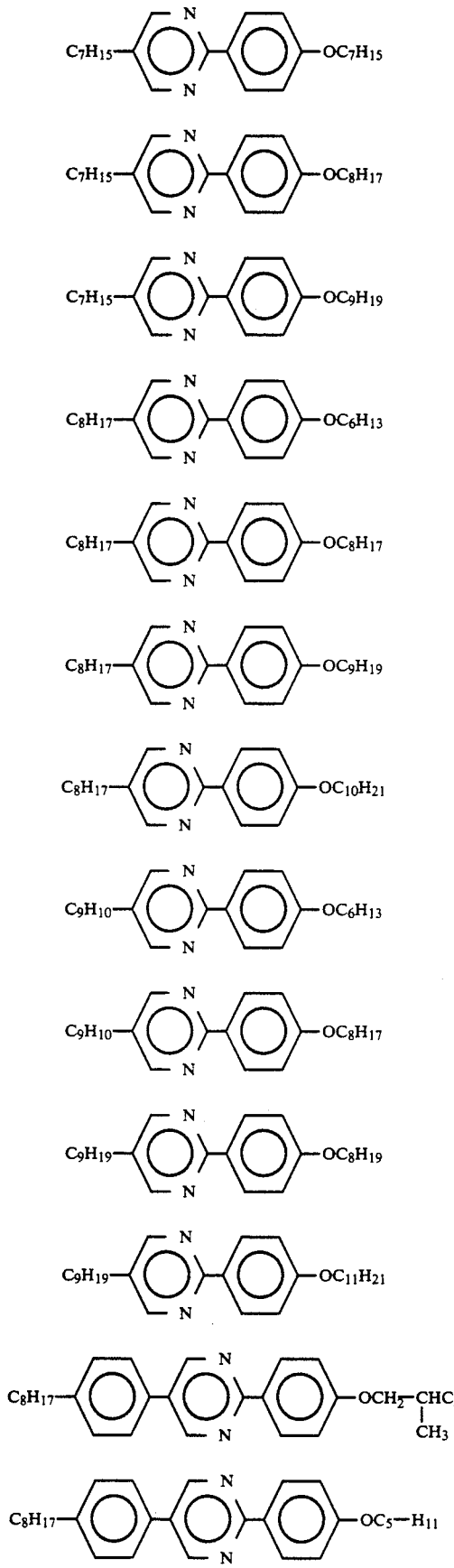

Compound II described above may be used singly or in combination with two or more thereof.

Specific examples of Compound III include the following, but they are not limited to the following.

(III₁) C₈H₁₇O—⟨⟩—COO—⟨⟩—OC₄H₉

(III₂) C₈H₁₇O—⟨⟩—COO—⟨⟩—OC₆H₁₃

(III₃) C₈H₁₇O—⟨⟩—COO—⟨⟩—OC₈H₁₇

(III₄) C₉H₁₉—⟨⟩—COO—⟨⟩—OC₆H₁₃

(III₅) C₁₀H₂₁O—⟨⟩—COO—⟨⟩—⟨⟩—C₅H₁₁

(III₆) C₈H₁₇O—⟨⟩—COO—⟨⟩—⟨⟩—C₅H₁₁

(III₇) C₈H₁₇—⟨⟩—COO—⟨⟩—⟨⟩—C₅H₁₁

(III₈) C₄H₉O—⟨⟩—COO—⟨⟩—⟨⟩—OC₈H₁₇

Compound III described above may be used singly or in combination with two or more thereof.

The ferroelectric liquid crystal composition of the present invention may be prepared, by containing at least one kind of Compound I and at least one kind of Compound II (referred to as Liquid Crystal Composition 1 hereinafter). In view of enlargement of the range of liquid crystal phase and stability thereof at room temperature, the content of Compound I described above in the Liquid Crystal Composition 1 is appropriately 1 to 40% by weight, and preferably 5 to 20% by weight. In this case, the content of Compound II is appropriately 60 to 99% by weight, and preferably 80 to 95% by weight. However, there is no specific limitation to the content of Compound I.

A product prepared by allowing Liquid Crystal Composition 1 to contain at least one of Compound III (referred to as Liquid Crystal Composition 2 hereinafter) is also included in the ferroelectric liquid crystal composition of the present invention. In Liquid Crystal Composition 2, the content of Compound III described above may be appropriately 1 to 40% by weight, and preferably 5 to 20% by weight. In this case, the contents of Compounds II and III may be appropriately 30 to 90% by weight and 3 to 30% by weight, respectively. Preferably, the contents of Compounds II and III are 65 to 90% by weight and 5 to 15% by weight, respectively.

The present invention also provides a ferroelectric liquid crystal composition, constituted by allowing aforementioned Liquid Crystal Composition 1 or 2, to contain at least one optically active compound. Any optically active compound containing carbons within its molecule may be used principally, but it is preferable to use one in a similar structure to the structure of a liquid crystal compound to be mixed with. Such optically active compound may include, for example, those represented by the general formulae (I), (II) and (III), but it is not limited to them.

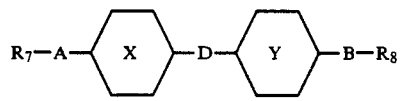  (IV)

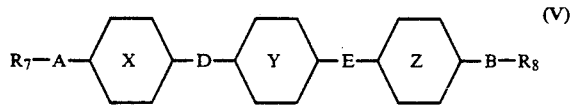  (V)

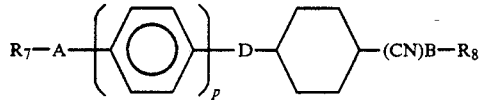  (VI)

wherein A and B independently represent a single bond or a group of —COO—, —OCO—, —CH=CH—COO—, —OCO—CH=CH—, —O—, —S—, —OCOO—, or —CO—; D and E independently represent a single bond or a group of —COO—, —OCO—, —CH=N—, —N=CH, —CH=CH—, —C≡C—, —CH=CH—COO—, —OCO—CH=CH—, —CH$_2$CH$_2$—, —OCH$_2$—, —CH$_2$O—, —COS— or —SCO—;

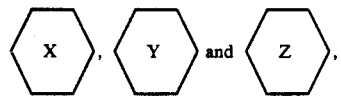

independently represents a group containing six-membered ring, including benzene ring, cyclohexane ring, bicyclo[2,2,2]octane ring, pyridine ring, pyrimidine ring, pyradine ring, pyridazine ring, piperazine ring, pyrane ring, dioxacyclohexane ring, thiapyrane ring, dithiane ring, thiadiazine ring, tetrazine ring, wherein the hydrogen atoms may be substituted with fluorine atom, chlorine atom, bromine atom, cyanogen group, nitro group, lower alkyl group, lower alkoxyl group or deutrium; $R_7$ and $R_8$ independently represent a linear or branched alkyl group having 1 to 15 carbon atoms, and the alkyl group may contain asymmetric carbon atoms; p is an integer of 1 or 2.

Representative examples of such optically active compound are illustrated below:

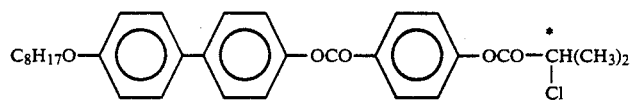  [1]

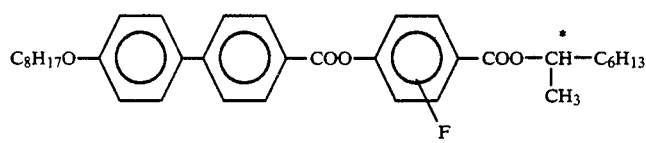  [2]

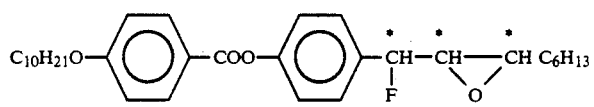  [3]

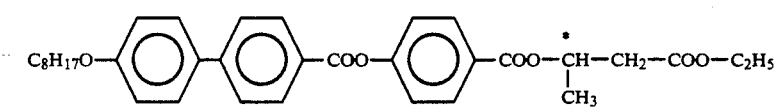  [4]

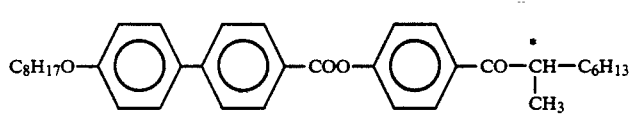  [5]

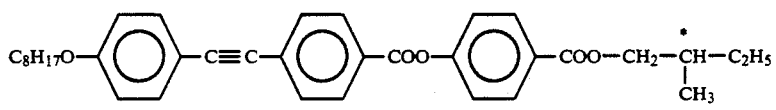  [6]

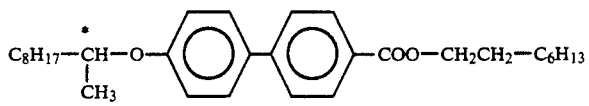  [7]

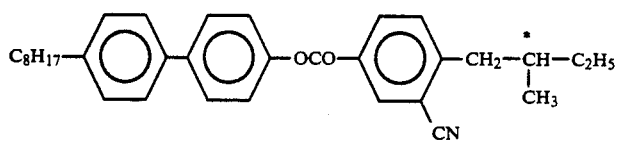

[8]

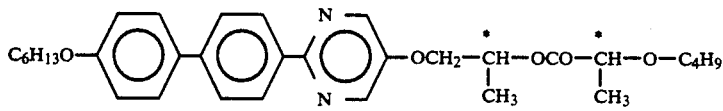

[9]

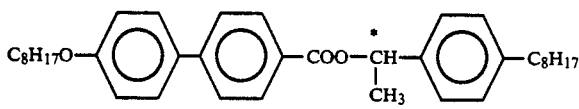

[10]

[1] T. Sakurai et. al, Ferroelectrics, 85, 469(1988)
[2] K. Furukawa et. al., Ferroelectrics, 85, 451(1988)
[3] D. M. Walba et. al., J. Am. Chem. Soc., 110, 8686(1988)
[4] K. Yoshino et. al., Jpn. J. Appl. Phys., 26,177 (1987)
[5] Yoshizawa et al., 14th Liquid Crystal Conference, 1B104(1988)
[6] Seto et al., 14th Liquid Crystal Conference, 1B106(1988)
[7] Kodene et al., 14th Liquid Crystal Conference, 1B114(1988)
[8] Kikuchi et al., 14th Liquid Crystal Conference, 1B117(1988)
[9] Miyazawa et al., 14th Liquid Crystal Conference, 1B119(1988)
[10] Koden et al., Japanese Chemical Association, 58th Spring Annual Meeting, 3 H02(1989)

In the ferroelectric liquid crystal composition of the present invention, such an optically active compound may be used singly or in combination of two or more thereof. It is preferred to use an appropriate combination of such compound, so that the combination may exhibit smectic C phase around room temperature and also has phase sequences such as IAC and INAC.

The content of the Compound I in the ferroelectric liquid crystal composition of the present invention is as described above, while the content of the optically active compound is 0.5 to 30% by weight, preferably 2 to 20% by weight in the final liquid crystal composition.

Furthermore, the present invention provides a liquid crystal device using the ferroelectric liquid crystal composition of the present invention between a pair of electrodes. The liquid crystal device may be constructed in a known constitution by using known materials in the art, as they are, except that the ferroelectric liquid crystal composition of the present invention is used as the liquid crystal composition of the device. Such a liquid crystal device may be preferable for a liquid crystal shutter, other than for the use in a liquid crystal display device.

The present invention will now be explained in Examples in detail, but it is not limited to them.

EXAMPLES

A. Synthetic Example of Compound

Preparation: [A-1]

Synthesis of [A-1] 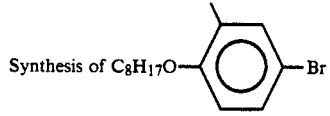 (I₁)

Synthesis of C₈H₁₇O— 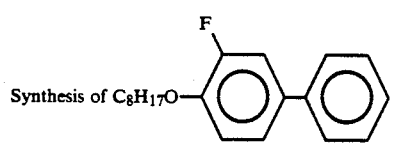 Step (A-1-a)

In a reactor, 15 g of 2-fluorophenol, 25.9 g of octylbromide, 46.2 g of potassium carbonate and 150 ml of cyclohexane were placed and stirred at 120°–130° C. for 12 hours. The reaction solution was added to dilute hydrochloric acid and extracted into benzene, followed by washing with water, and dehydrated over Glauber's salt. Subsequently, the solvent was distilled off. The residual fraction and 100 ml of chloroform were placed in another reactor, to which was added dropwise 44 g of bromine under stirring at room temperature and further stirred for additional 6 hours at the same temperature. The reaction mixture was added to dilute aqueous sodium hydroxide solution and stirred. The chloroform layer was washed with water and dehydrated over Glauber's salt. The residue after distilling off the solvents was vacuum distilled to obtain 32 g of 3-fluoro-4-octyloxybromobenzene (78.8%).

bp. 122°–130° C./0.3 mmHg

Step (A-1-b)

Synthesis of C₈H₁₇O—

In a reactor were placed 22 g of magnesium, a small amount of iodine and 50 ml of tetrahydrofurane (THF) under nitrogen stream, to which was added an appropriate amount of a solution of 144 g of bromobenzene in 150 ml THF and heated. After initiation of reaction, the remaining THF solution was added dropwise under refluxing and stirring and further stirred for additional 2 hours after completion of addition, to prepare a Grignard reagent.

In another vessel were placed 3.6 g of Cl₂Pd(PPh₃)₂ and 100 ml of THF, to which were sequentially added 26 ml of 1M solution of (iso-C₄H₉)₂AlH/hexane and a solution of 177.3 g of 3-fluoro-4-octyloxybromobenzene obtained in (A-1-a) in 150 ml THF. This mixture was heated, to which was added dropwise the Grignard reagent, previously prepared, at 50°–60° C. and then left to stand at the same temperature for two hours. The reaction solution was added to dilute hydrochloric acid and extracted into benzene, followed by washing with water and dehydration over Glauber's salt. Subsequently, the solvent was distilled off. The remaining fraction was recrystallized with a chloroform/hexane mixture solvent and purified by silica gel chromatography (elution solvent; hexane) to obtain 3-fluoro-4-octyloxybiphenyl.

Yield 137.5 g (78.3%) GLC 98% or more.

Step (A-1-c)

Synthesis of C₈H₁₇O—

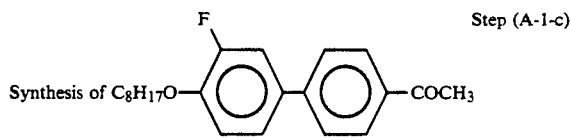

—COCH₃

In a reactor were placed 141 g of 3-fluoro-4-octyloxybiphenyl and 400 ml of methylene chloride, to which was gradually added 94 g of anhydrous aluminum chloride at 0° C. or less under stirring and then was added dropwise 56 g of acetylchloride. After completion of dropwise addition, the mixture was stirred for 6 hours while increasing the temperature. The reaction solution was added to dilute hydrochloric acid, and the organic layer was washed with water and dehydrated over Glauber's salt. Subsequently, the solvent was distilled off. The remaining fraction was recrystallized with chloroform, to obtain 3-fluoro-4-octyloxy-4'-acetylbiphenyl.

Yield 154.4 g (95.8%) GLC 99% or more.

Step (A-1-d)

Synthesis of C₈H₁₇O—

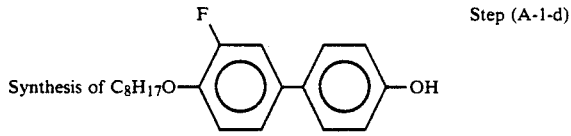

—OH

In a reactor were placed 9.15 g of 3-fluoro-4-octyloxy-4'-acetylbiphenyl obtained in (A-1-c), 36 g of 88% formic acid and 90 ml of methylene chloride, to which were sequentially added dropwise under stirring at room temperature, 16 g of acetic anhydride, 1.0 ml of conc. sulfuric acid and 30 ml of 35% aqueous hydrogen peroxide. After completion of dropwise addition, the reaction mixture was stirred, under refluxing, with TLC (Kieselgel 60F254, Developing solution; benzene) until the material disappeared. The reaction solution was added to water and stirred for one hour. Then, the organic layer was washed with water until washing solution became neutral, and dehydrated over Glauber's salt. After the solvent was distilled off, 70 ml of methanol and 40% aqueous sodium hydroxide solution were added to the remaining fraction and reacted together under stirring at 70° C. for 3 hours. The reaction solution was added to water and acidified with hydrochloric acid, followed by extraction into ether, washing with water and dehydration over Glauber's salt. After the solvent was distilled off, the remaining fraction was recrystallized with acetone to obtain 3-fluoro-4-octyloxy-4-hydroxybiphenyl.

Yield 5.94 g (70.5%); GLC 99% or more.

Step (A-1-e)

Synthesis of C₈H₁₇O—

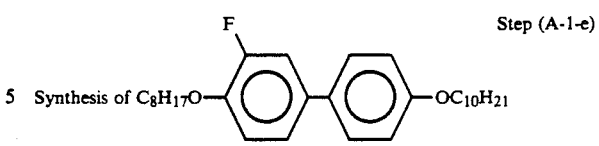

—OC₁₀H₂₁

In a reactor were placed 2.00 g of 3-fluoro-4-octyloxy-4'-hydroxybiphenyl obtained in (A-1-d), 1.4 g of decylbromide, 1.8 g of potassium carbonate and 15 ml of cyclohexanone and reacted together at 110°–130° C. for 5 hours. The reaction solution was filtered and the thus obtained solid product was washed with benzene. The washing solution was mixed with the filtrate and washed with water, which was then dehydrated over Glauber's salt.

After the solvent was distilled off, the remaining fraction was recrystallized with acetone to obtain 3-fluoro-4,4'-dioctyloxybiphenyl.

Yield 2.66 g (92.2%).

The purity of the product was determined by HPLC to be 99% or more. It was confirmed that the product was the objective product (Compound I₁), based on the finding that a molecular ion peak was observed at 456 by IR and Mass spectral analyses, and the relation of the finding with the materials used.

Preparation [A-2]

Synthesis of [A-2] C₈H₁₇O—

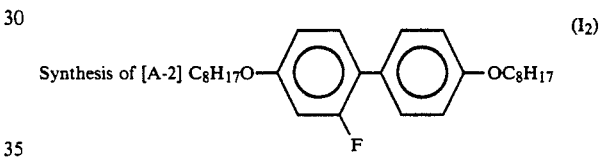

—OC₈H₁₇

(I₂)

Step (A-2-a)

Synthesis of CH₃CO—

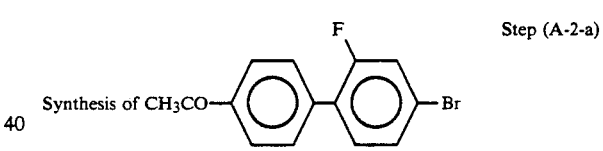

—Br

In a reactor were placed 113 g of anhydrous aluminum chloride and 600 l of methylene chloride, to which was added 113 g of acetylchloride under stirring at 0° C. or less. Subsequently, a solution of 100 g of 2-fluoro-4-bromobiphenyl in 400 ml methylene chloride was added dropwise, stirred and reacted together for 7 hours while increasing the temperature up to room temperature. After adding the reaction solution to ice/dilute hydrochloric acid, the methylene chloride layer was washed sequentially with water, aqueous sodium hydrogencarbonate solution, and water, followed by dehydration over Glauber's salt and distillation of the solvent. The remaining fraction was recrystallized with acetone to obtain 2-fluoro-4-bromo-4'-acetylbiphenyl.

Yield 96 g (82.2%), GLC 100% or more.

Step (A-2-b)

Synthesis of HO—

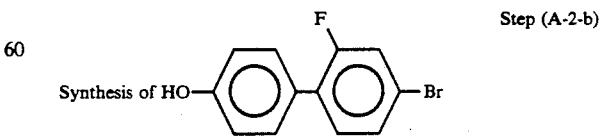

—Br

In a reactor were placed 65 g of 2-fluoro-4-bromo-4'-acetylbiphenyl obtained in (A-2-a) and 300 ml of methylene chloride, to which were added dropwise, under stirring at 10° C., 500 ml of 88% formic acid and 480 ml of acetic anhydride. After 1.5 ml of conc. sulfuric acid was further added dropwise, 150 ml of 35% hydrogen peroxide was added dropwise over three hours. After completion of dropwise addition, the temperature was increased gradually and additional stirring was carried out at 45°–50° C. for 30 hours. The reaction solution was added to ice/water and extracted into benzene, followed by washing sequentially with aqueous sodium hydrogencarbonate and water, and dehydrated over Glauber's salt. After the solvent was distilled off, the remaining fraction was obtained. The remaining fraction and 2 l of ethylalcohol were placed in another reactor, to which was added 25% aqueous sodium hydroxide solution and stirred under refluxing for 8 hours. The reaction solution was added to ice/dilute hydrochloric acid, extracted into benzene, washed with water and dehydrated over Glauber's salt. After the solvent was distilled off, the remaining fraction was purified by silica gel chromatography (elution solution; benzene) to obtain 2-fluoro-4-bromo-4'-hydroxybiphenyl.

Yield 28.1 g (47.5%).

Step (A-2-c)

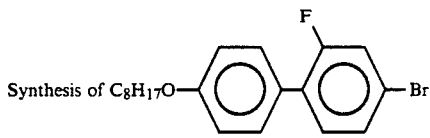

In a reactor, 5 g of 2-fluoro-4-bromo-4'-hydroxybiphenyl obtained in (A-2-b), 8.63 g of octylbromide, 4 g of potassium carbonate and 50 ml of 2-butanone (MEK) were placed, and reacted together under stirring and refluxing for 8 hours. The reaction solution was then added to dilute hydrochloric acid and extracted into benzene, followed by washing with water and dehydration over Glauber's salt. Subsequently, the solvent was distilled off. The residual fraction was recrystallized in an acetone/methanol mixture solvent to obtain 6.45 g of 2-fluoro-4-bromo-4'-octyloxybiphenyl (90.8%).

Yield 6.45 g (90.8%); TLC monospot.

Step (A-2-d)

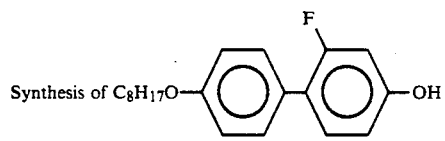

In a reactor were placed 8.6 g of magnesium and a small amount of iodine, to which was added a small amount of a solution of 135 g of 2-fluoro-4-bromo-4'-octyloxybiphenyl obtained in (A-2-c) in 200 ml THF and heated. After initiation of reaction, the remaining THF solution was added dropwise. After completion of dropwise addition, the reaction mixture was refluxed for 3 hours to prepare a Grignard reagent. In another vessel was placed 68 g of boric acid tributylester, to which was added dropwise at 40° C. the Grignard reagent previously prepared and then stirred at the same temperature for additional one hour. After leaving the reaction mixture to stand for cooling, 10% aqueous sulfuric acid was added dropwise under stirring, and then 50 ml of benzene was added to the resulting solution for extraction. In another reactor, the benzene extraction was placed and 72 ml of 20% aqueous hydrogen peroxide was added dropwise under stirring at 40°–50° C., followed by stirring for additional 2 hours. The reaction solution was added to water, and the benzene layer was treated with aqueous sodium hydrogensulfite solution, followed by washing with water and dehydration over Glauber's salt. After the solvent was distilled off, the remaining fraction was purified by silica gel chromatography (elution solvent; hexane benzene) to obtain 2-fluoro-4-hydroxy-4'-actyloxybiphenyl.

Yield 84.5 g (75.5%).

Step (A-2-e)

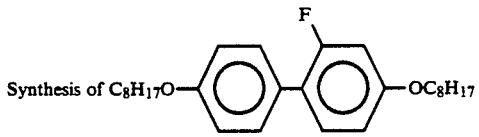

In a reactor were placed 5.0 g of 2-fluoro-4-hydroxy-4'-octyloxyphenyl obtained in (A-2-b), 3.1 g of octylbromide, 4.4 g of potassium carbonate, and 35 ml of cyclohexanone, and reacted together at 110°–130° C. for 5 hours. After filtering the reaction solution, the solid product was washed with benzene. The washing solution was mixed with the filtrate, washed with water and dehydrated over Glauber's salt. After the solvent was distilled off, the remaining solution was recrystallized with acetone to obtain 2-fluoro-4,4'-dioctyloxybihenyl.

Yield 6.46 g (95.5%).

The purity of the product was determined by HPLC to be 99% or more. It was confirmed that the product was the objective product (Compound I₂), based on the finding that a molecular ion peak was observed at 428 by IR and Mass spectral analyses, and the relation of the finding with the materials used.

Preparation (A-3)

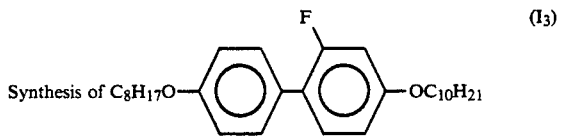

(I₃)

The same procedure as in (A-2-e) of [A-2] was performed except that 3.5 g of decylbromide was used instead of 3.1 g of octylbromide, to obtain 2-fluoro-4-decyloxy-4'-octyloxybihenyl.

Yield 6.86 g (95.2%).

The purity of the product was determined by HPLC to be 99% or more. It was confirmed that the product was the objective product (Compound I₃), based on the finding that a molecular ion peak was observed at 428 by IR and Mass spectral analyses, and the relation of the finding with the materials used.

Preparation [A-4]

Synthesis of

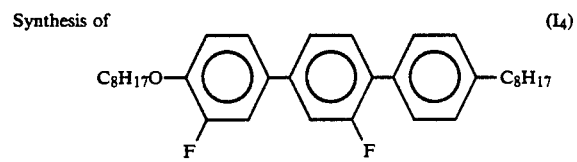

(I₄)

Step (A-4-a)

-continued

Synthesis of 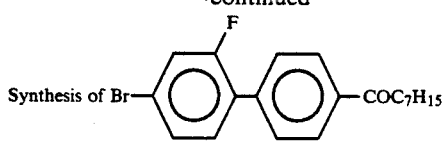

In a reactor were placed 20 ml of methylene chloride and 3.2 g of anhydrous aluminum chloride, to which was added 4 g of octanoylchloride under stirring at −5° C. or less. Subsequently, a solution of 3 g of 4-bromo-2-fluorobiphenyl in 10 ml methylene chloride was added dropwise.

After completion of dropwise addition, reaction was effected under stirring at 0° C. or less for 3 hours and the reaction solution was left to stand overnight at room temperature. The reaction solution was added to ice/dilute hydrochloric acid, and extracted into benzene. The benzene solution was washed with water and treated with dilute aqueous ammonia, followed sequentially by washing with water and dehydration over Glauber's salt. The residue, after benzene was distilled off, was recrystallized with acetone to obtain 3.8 g of 4-octanoyl-2'-fluoro-4'-bromobiphenyl (84.2%).

TLC monospot.

Step (A-4-b)

Synthesis of 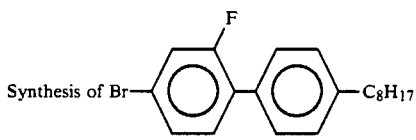

In a reactor were placed 3.75 g of 4-octanoyl-2'-fluoro-4'-bromobiphenyl and 20 ml of trifluroacetic acid, to which was added 2.4 g of triethylsilane at room temperature and stirred for 6 hours. Then, the reaction solution was added into water, extracted into benzene, washed sequentially with water, aqueous sodium hydrogencarbonate, and again water, and dehydrated over Glauber's salt. After the solvent was distilled off, the residue was evaporated in a glass tube oven (GTO) to obtain 2.56 g of 4-octyl-2'-fluoro-4'-bromobiphenyl (71.1%).

Preset temperature of GTO 150° C./0.2 mmHg.
TLC monospot.

Step (A-4-c)

Synthesis of 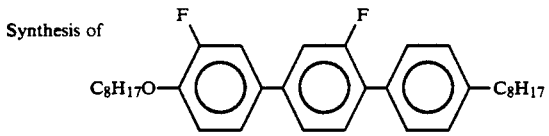

In a reactor were placed 0.4 g of magnesium powder and a small amount of iodine, to which was added a small amount of a solution of 3.6 g of 4-octyloxy-3-fluorobromobenzene in 20 ml THF and reacted together. The remaining THF solution was then added dropwise under stirring and refluxing, and stirred under refluxing for additional 2 hours to prepare a Grignard reagent.

In another vessel were sequentially placed, under nitrogen stream, 0.1 g of dichlorobistriphenylphosphine palladium [$Cl_2Pd(PPh_3)_2$], 200 ml of THF, 0.5 ml of 1M hexane solution of di-isobutylaluminium hydride [(iso-$C_4H_9$)$_2$AlH] and a solution of 2.2 g of 4-octyl-2'-fluoro-4'-bromobiphenyl obtained above in (A-4-b) in 20 ml THF. The Grignard reagent previously prepared was subsequently added under stirring at 50° C. and stirred for 6 hours at the same temperature. The reaction solution was added to dilute hydrochloric acid and extracted into benzene, followed by washing with saline and dehydration over Glauber's salt. After the solvent was distilled off, the remaining fraction was purified by silica gel chromatography (elution solvent; hexane:benzene=6:1) and recrystallized with acetone to obtain 1.0 g of 4-octyloxy-3,3'-difluoro-4''-octyl-p-terphenyl (32.6%).

The purity of the product was determined by HPLC to be 99% or more. It was confirmed that the product was the objective product (Compound I$_4$), based on the finding that a molecular ion peak was observed at 506 by IR and Mass spectral analyses, and the relation of the finding with the materials used.

EXAMPLES 1-6, COMPARATIVE EXAMPLES 1-3

Liquid crystal compositions shown in Table 3 were prepared, by using the compounds shown in Table 1 and the compositions shown in Table 2. Phase transition temperature is shown in Table 3.

The liquid crystal compositions of the present embodiment, shown in Example 1, contain Compound I and pyrimidine compound II, whereby they are superior to the liquid crystal composition of Comparative Example 1, consisting of pyrimidine compound II alone, in terms of crystallization temperature at lower temperature.

The liquid crystal compositions of the present embodiment, shown in Example 2, contain Compound I, pyrimidine compound II, and ester compound III, whereby they are superior to the liquid crystal composition of Comparative Example 1, consisting of pyrimidine compound II alone, in terms of crystallization temperature at lower temperature and upper temperature limit of smectic C phase.

The liquid crystal compositions of the present invention, shown in Examples 3 and 4, contain Compound I, pyrimidine compound II and ester compound III, whereby they are superior to the liquid crystal compositions of Comparative Examples 1 and 2, both compositions consisting of pyrimidine compound II alone, in terms of crystallization temperature at lower temperature and upper temperature limit of smectic C phase.

The liquid crystal compositions of the present invention, shown in Examples 5 and 6, contain Compound pyrimidine compound II and ester compound III, whereby they are superior to the liquid crystal composition of Comparative Example 3, consisting of pyrimidine compound II and ester compound III, in terms of crystallization temperature at lower temperature.

TABLE 1

| Compound (Comp.) | Structure | Phase Transition (°C.) C | $S_C$ | $S_A$ | N | I |
|---|---|---|---|---|---|---|
| Comp. I₁ | C₈H₁₇O–⌬–⌬(F)–OC₁₀H₂₁ | .81 | (.79) | .86 | — | . |
| Comp. I₂ | C₈H₁₇O–⌬(F)–⌬–OC₈H₁₇ | .36 | .54 | — | .65 | . |
| Comp. I₃ | C₁₀H₂₁O–⌬(F)–⌬–OC₈H₁₇ | .51 | (.40) | — | .63 | . |
| Comp. I₄ | C₈H₁₇O–⌬(F)–⌬(F)–C₈H₁₇ | .60 | .109 | .128 | — | . |
| Comp. II₁ | C₈H₁₇–⌬–pyrazine–⌬–OCH₂CHC₂H₅(CH₃) | .91 | .155 | .169 | — | . |
| Comp. II₂ | C₈H₁₇–⌬–pyrazine–⌬–OC₅H₁₁ | .73 | .114 | .203 | — | . |
| Comp. III₁ | C₈H₁₇O–⌬–COO–⌬–OC₄H₉ | .58 | .60 | — | .89 | . |
| Comp. III₂ | C₈H₁₇O–⌬–COO–⌬–OC₆H₁₃ | .55 | .66 | — | .90 | . |
| Comp. III₃ | C₈H₁₇O–⌬–COO–⌬–OC₈H₁₇ | .61 | .73 | — | .90 | . |
| Comp. III₄ | C₈H₁₈–⌬–COO–⌬–OC₈H₁₃ | .41 | (.37) | — | .64 | . |
| Comp. III₅ | C₁₀H₂₁O–⌬–COO–⌬–cyclohexyl–C₅H₁₁ | .73 | .120 | .127 | .170 | . |
| Comp. III₆ | C₈H₁₇O–⌬–COO–⌬–cyclohexyl–C₅H₁₁ | .82 | .100 | — | .183 | . |

TABLE 1-continued

| Compound (Comp.) | Structure | Phase Transition (°C.) C | Sc | S_A | N | I |
|---|---|---|---|---|---|---|
| Comp. III_7 | C_8H_17—⟨⟩—COO—⟨⟩—⟨H⟩—C_5H_11 | .59 | — | — | .158 | . |
| Comp. III_8 | C_4H_9O—⟨⟩—COO—⟨⟩—⟨⟩—OC_8H_17 | .139 | (.129) | — | .209 | . |

TABLE 2

$C_nH_{2n+1}$—⟨N⟩—⟨⟩—$OC_mH_{2m+1}$ (=PYPnOm)

| nOm = | 707 | 708 | 709 | 806 | 808 | 809 | 8010 | 906 | 908 | 909 | 9011 | C | Sc | S_A | N | I |
|---|---|---|---|---|---|---|---|---|---|---|---|---|---|---|---|---|
| Comp. II_C1 | 5 | 10 | 15 | | 20 | | 30 | 20 | | | | • <5 | • 51 | • 63 | • 69 | • |
| Comp. II_C2 | | 9 | 8 | 15 | | 15 | 10 | | 14 | 14 | 15 | • <5 | • 55 | • 68 | • 71 | • |
| Comp. II_C3 | | 10 | 6 | | 14 | 21 | 11 | | 20 | 19 | | <5 | • 55 | • 68 | • 71 | • |
| Comp. II_C4 | | 10 | 5 | | 20 | 20 | 5 | | 20 | 20 | | <5 | • 57 | • 69 | • 71 | • |

Comp. (= Composition)

TABLE 3

| | Examples | | | | | | Comparative Examples | | |
|---|---|---|---|---|---|---|---|---|---|
| | 1 | 2 | 3 | 4 | 5 | 6 | 1 | 2 | 3 |
| Composition | | | | | | | | | |
| Comp. I_1 | 5 | 4 | | | | | | | |
| Comp. I_2 | 10 | 4 | 5 | 4 | 9 | 8 | | | |
| Comp. I_3 | 16 | 4 | 5 | 4 | | | | | |
| Comp. I_4 | | 5 | | | | | | | |
| Comp. II_1 | | 6 | 7 | 6 | 9 | 8 | | | 7 |
| Comp. II_2 | | 5 | 13 | 12 | 10 | 9 | | | 7 |
| Comp. III_1 | | | | 4 | | 6 | | | |
| Comp. III_2 | | | | 4 | | 4 | | | |
| Comp. III_3 | | | | | | | | | 6 |
| Comp. III_4 | | | | | | | | | 4 |
| Comp. III_5 | | 5 | | | 6 | 5 | | | 4 |
| Comp. III_6 | | 5 | | | 5 | 5 | | | 4 |
| Comp. III_7 | | | 4 | 4 | | | | | |
| Comp. III_8 | | | 4 | 3 | | | | | |
| Comp. II_C1 | 69 | | | | | | 100 | | |
| Comp. II_C1 | | 62 | | | | | | | 60 |
| Comp. II_C3 | | | | | 61 | 55 | | 100 | |
| Comp. II_C4 | | | 62 | 59 | | | | | |
| Transition | | | | | | | | | |
| C→S_C | <0 | <−5 | <−5 | <−10 | <−10 | <−15 | <5 | <5 | <−5 |
| S_C→S_A | 52 | 65 | 65 | 62 | 63 | 60 | 51 | 55 | 62 |
| S_A→N or I | 60 | 83 | 84 | 82 | 85 | 81 | 63 | 68 | 83 |
| N→I | 67 | 87 | — | 87 | 89 | 90 | 69 | 71 | 87 |

EXAMPLE 7

A ferroelectric liquid crystal composition shown below in Table 4 was prepared, using Compounds I, II and III.

The ferroelectric liquid crystal composition exhibited smectic C phase at room temperature and their phase transition was as shown below:

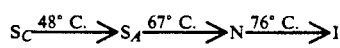

$$S_C \xrightarrow{48°C.} S_A \xrightarrow{67°C.} N \xrightarrow{76°C.} I$$

[wherein $S_C$, $S_A$, N and I represent smectic C phase, smectic A phase, nematic phase and isotropic liquid, respectively].

Ferroelectric liquid crystal devices using the liquid crystal composition prepared above will now be explained.

FIG. 1 is a sectional view illustrating a constitution of a liquid crystal devices using the ferroelectric liquid crystal composition of the present invention.

FIG. 1 is an example of transmission type display device, where 1 and 2 are insulating substrates; 3 and 4 are conductive films; 5 is an insulating film; 6 is an orientation-controlled layer; 7 is a sealant; 8 is a ferroelectric liquid crystal; and 9 is a deflector plate.

Phototransmission substrates are used for the insulating substrates 1 and 2, and generally glass substrates are employed. Clear ceramic substrates are also used therefor.

Clear electrodes 3 and 4, which are composed of conductive thin films comprising $In_2O_3$, $SnO_2$, ITO(Indium-Tin Oxide), individually, and have predetermined patterns, are formed on the the the insulating substrates 1 and 2.

On the substrates is formed an insulating film 5, but the film may be omitted in some cases. As the insulating film 5, there may be used, for example, inorganic thin film such as $SiO_2$, $SiN_x$, $Al_2O_3$, etc., and organic thin film such as polyimide, acrylic resin, photoresist resin, polymer liquid crystal, etc.. In case that the insulating film 5 is composed of inorganic thin film, the film 5 may be formed by deposition process, sputtering process, CVD (Chemical Vapor Deposition) process or solution coating process. In case that the insulating film 5 is composed of organic thin film, the film 5 may be formed by using a solution dissolving an organic substance or a solution of its precursor according to spin-coating process, immersion application process, screen printing process, roller application process and curing it at predetermined conditions (heating, photoirradiation, etc.); the thin film may be formed also by LB (Langumuir-Blodgett) process as well as deposition process, sputtering process, CVD process.

On the insulating film is formed an orientation-controlled layer 6. In case that the insulating film 5 is omitted, however, the orientation-controlled layer 6 may be formed directly on the conductive films 3 and 4. As the orientation-controlled layer 6, inorganic layer may be used in some cases, while organic layer may be also used in other cases.

In case that an inorganic orientation-controlled layer is used, slant deposition of silicone oxide is commonly used. Rotation depositioning may be also used. In case that an organic orientation-controlled layer is used, nylon, polyvinylalcohol, polyimide and the like may be used. Generally, rubbing is effected on the layer. Orientation by using polymer liquid crystal or LB membrane, orientation by magnetic field, orientation by spacer edge process may be also carried out. $SiO_2$, $SiN_X$ and the like may be formed by deposition process, sputtering process, CVD process and the like, on which rubbing may be effected.

The two insulating substrates are laminated together, and then liquid crystal is injected between them to produce a ferroelectric liquid crystal device.

Figure 2:
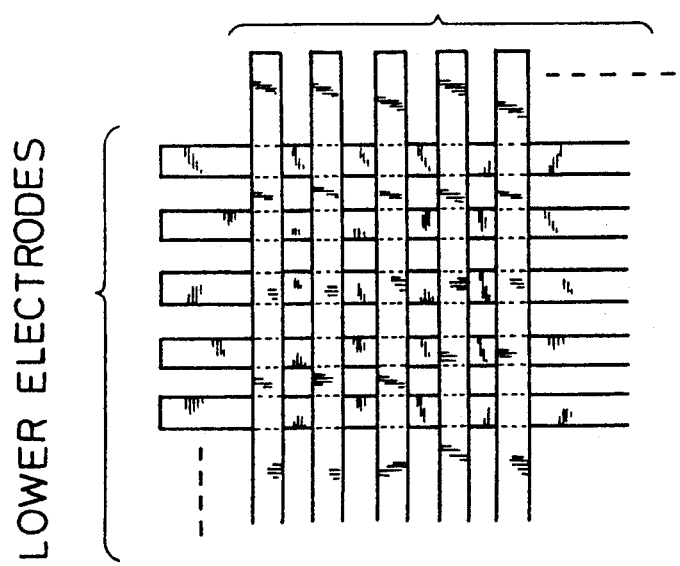
FIG. 2 is a plane view illustrating a constitution of a large-capacity ferroelectric liquid crystal device utilizing a ferroelectric liquid crystal composition of the present invention.

The ferroelectric liquid crystal device of the present invention is explained as a switching element with one pixel, in FIG. 1. The ferroelectric liquid crystal and liquid crystal device of the present invention may be also applied to a display device with a large capacity matrix, wherein the wiring on the upper substrate together with the wiring on the lower substrate is formed into a matrix type for use, as is shown in a plane schematic view of FIG. 2. Such matrix-type liquid crystal device may be driven by various driving methods which have been proposed currently [see for example, Wakita, Kamimura, Onishi, Oniwa, Kobayashi, Ota, National Technical report,33, 44 (1987)].

In the liquid crystal device explained above, an ITO film was formed on two glass substrates, on which $SiO_2$ film was formed. Subsequently, PVA film was applied thereon for rubbing.

Then, the two glass substrates were laminated together with a cell thickness of 2 um, between which was injected a ferroelectric liquid crystal composition prepared. After injection, the cell was temporarily heated up to 90° C. where the liquid crystal composition was changed into isotropic liquid and then cooled down to room temperature with a rate of 1° C./min, to obtain a ferroelectric liquid crystal element in excellent orientation.

The ferroelectric liquid crystal device was arranged between two polarizers being orthogonal to each other, and a rectangular wave of $V_{p-p}=20$ V was applied subsequently. There was observed a change in the intensity of transmission light. The response speed determined by the change in the intensity of transmission light was 308 μsec at 25° C., while the tilt angle was 20°.

COMPARATIVE EXAMPLE 4

The ferroelectric liquid crystal composition with a composition shown in Table 4 was prepared, by substituting Compound I in Example 1 with ester compound. The phase transition of the ferroelectric liquid crystal composition was as follows:

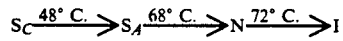

A ferroelectric liquid crystal device similar to the device in Example 1 was prepared. The ferroelectric liquid crystal device was arranged between two polarizers being orthogonal to each other, and a rectangular wave of $V_{p-p}=20$ V was applied subsequently thereto. There was observed a change in the intensity of transmission light. The response speed determined by the change in the intensity of transmission light was 367 μsec at 25° C., while the tilt angle was 16°.

TABLE 4

| Compounds | Composition (wt %) | |
|---|---|---|
| | Example 7 | Compara. Exam. 4 |
| $C_7H_{15}$—(N-phenyl-N)—(phenyl)—$OC_7H_{15}$ | 7 | 7 |
| $C_7H_{15}$—(N-phenyl-N)—(phenyl)—$OC_8H_{17}$ | 4 | 4 |

TABLE 4-continued

| Compounds | Composition (wt %) | |
|---|---|---|
| | Example 7 | Compara. Exam. 4 |
| C₇H₁₅–[pyrazine]–[phenyl]–OC₉H₁₉ | 10 | 10 |
| C₈H₁₇–[pyrazine]–[phenyl]–OC₈H₁₇ | 15 | 15 |
| C₈H₁₇–[pyrazine]–[phenyl]–OC₁₀H₂₁ | 22 | 22 |
| C₉H₁₉–[pyrazine]–[phenyl]–OC₆H₁₃ | 12 | 12 |
| (S)-C₈H₁₇O–[pyrazine]–[phenyl]–OCH₂CH₂CHC₂H₅(CH₃) | 4 | 4 |
| C₈H₁₇–[phenyl]–[pyrimidine]–[phenyl]–OC₅H₁₁ | 4 | 4 |
| C₁₀H₂₁O–[phenyl]–COO–[phenyl]–[cyclohexyl]–C₅H₁₁ | 3 | 3 |
| C₈H₁₇O–[phenyl]–COO–[phenyl]–OC₈H₁₃ | | 4 |
| C₈H₁₇O–[phenyl]–COO–[phenyl]–OC₇H₁₅ | | 5 |
| C₈H₁₇O–[phenyl]–COO–[phenyl]–OC₈H₁₇ | | 5 |
| C₆H₁₃–[phenyl]–[phenyl]–COO–[phenyl]–OC₁₀H₂₁ | | 3 |
| C₈H₁₇–[phenyl(F)]–[phenyl]–OC₁₀H₂₁ | 3 | |

TABLE 4-continued

| Compounds | Composition (wt %) | |
|---|---|---|
| | Example 7 | Compara. Exam. 4 |
| $C_8H_{17}O$—〈ring〉—〈ring(F)〉—$OC_8H_{17}$ | 8 | |
| $C_{10}H_{21}O$—〈ring〉—〈ring(F)〉—$OC_8H_{17}$ | 4 | |
| $C_8H_{17}O$—〈ring(F)〉—〈ring(F)〉—〈ring〉—$C_8H_{17}$ | 2 | |
| (S)-$C_8H_{17}O$—〈ring〉—〈ring〉—COO—CH($CH_3$)—〈ring〉—$C_8H_{17}$ | 2 | 2 |
| Phase transition temperature (°C.) $S_C \rightarrow S_A$ | 48 | 48 |
| $S_A \rightarrow N$ | 67 | 68 |
| $N \rightarrow I$ | 76 | 72 |
| Response rate (usec) | 308 | 367 |
| Tilt angle 0 (deg) | 20 | 16 |

Comparison of Example 7 with Comparative Example 4 demonstrates that the liquid crystal composition of the present invention is superior in terms of response speed and tilt angle.

As are demonstrated in Examples, the liquid crystal composition of the present invention is superior to conventional liquid crystal compositions, regarding the temperature range of smectic C phase and response characteristics. By using the liquid crystal composition, there may be provided a ferroelectric liquid crystal device with a larger capacity, which has a good orientation property, brightness due to high contrast, and a wide range of operable temperature.

What is claimed is:

1. A ferroelectric liquid crystal composition, comprising at least one compound represented by the following general formula (I):

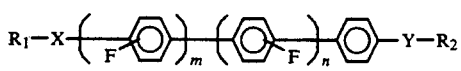

(I)

wherein $R_1$ and $R_2$ independently represent an alkyl group or an alkoxyl group, having 1 to 15 carbon atoms; X and Y independently represent a single bond, or a group of —O—, —COO—, or —OCO—; n and m independently represent 0 to 1 provided the sum of n and m is at least 1, and at least one compound represented by the following general formula (II):

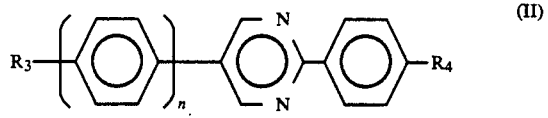

(II)

wherein $R_3$ and $R_4$ independently represent an alkyl group or an alkoxyl group, having 1 to 15 carbon atoms; n represents 0 to 1, the composition comprising an optically active compound, and the at least one compound of formula (I) is present in an amount of from about 1 to 40 percent by weight and the at least one compound of formula (II) is present in an amount of from about 99 to 60 percent by weight.

2. The liquid crystal composition of claim 1 in which the contents of the compounds represented by the formulas (I) and (II) are 5 to 20% by weight and 95 to 80% by weight, respectively.

3. The liquid crystal composition of claim 1 further comprising at least one compound represented by the following general formula (III):

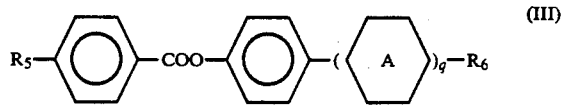

(III)

and the at least one compound of formula (III) is present in an amount of from about 3 to 30 percent by weight.

4. The liquid crystal composition of claim 3 in which the contents of the compounds represented by the formulas (I) and (II) are 1 to 40% by weight and 30 to 90% by weight, respectively.

5. The liquid crystal composition of claim 3 in which the contents of the compounds represented by the formulas (I), (II) and (III) are 5 to 20% by weight, 65 to 90% by weight and 5 and 15% by weight, respectively.

6. A liquid crystal device interposing a liquid crystal composition layer between a pair of electrodes, the liquid crystal composition layer comprising the ferroelectric liquid crystal composition as defined in claim 1.

* * * * *